United States Patent
Han et al.

(10) Patent No.: US 7,756,663 B2
(45) Date of Patent: Jul. 13, 2010

(54) SELF-CALIBRATION SYSTEMS AND METHODS

(75) Inventors: Dong Hoon Han, Alpharetta, GA (US); Abhijit Chatterjee, Atlanta, GA (US); Selim Sermet Akbay, Atlanta, GA (US); Soumendu Bhattacharya, Atlanta, GA (US); William R. Eisenstadt, Gainesville, FL (US)

(73) Assignees: Georgia Tech Research Corporation, Atlanta, GA (US); University of Florida Research Foundation, Gainesville, FL (US)

( * ) Notice: Subject to any disclaimer, the term of this patent is extended or adjusted under 35 U.S.C. 154(b) by 865 days.

(21) Appl. No.: 11/475,684

(22) Filed: Jun. 27, 2006

(65) Prior Publication Data
US 2010/0145651 A1 Jun. 10, 2010

Related U.S. Application Data

(60) Provisional application No. 60/694,388, filed on Jun. 27, 2005.

(51) Int. Cl.
*G01R 35/00* (2006.01)
*G01D 18/00* (2006.01)
*G01P 21/00* (2006.01)

(52) U.S. Cl. .......................... 702/99; 702/85

(58) Field of Classification Search ............... 702/99, 702/107, 110–112, 117, 181, 57, 58, 85, 702/109, 118, 182, 183, 185; 324/601–603, 324/605, 609
See application file for complete search history.

(56) References Cited

U.S. PATENT DOCUMENTS

| | | | | |
|---|---|---|---|---|
| 6,118,811 A | * | 9/2000 | Narumi et al. | 375/219 |
| 6,128,561 A | * | 10/2000 | Janata | 701/29 |
| 6,865,500 B1 | | 3/2005 | Variyam et al. | 702/117 |
| 7,031,866 B1 | * | 4/2006 | Behera et al. | 702/117 |
| 7,554,335 B2 | * | 6/2009 | Han et al. | 324/537 |
| 2003/0093730 A1 | * | 5/2003 | Halder et al. | 714/724 |
| 2006/0223558 A1 | * | 10/2006 | Behzad | 455/502 |
| 2007/0033474 A1 | * | 2/2007 | Han et al. | 714/742 |

OTHER PUBLICATIONS

Abstract of Tejasvi Das et al., "Dynamic Input Match Correction in RF Low Noise Amplifiers", 2004.*
Tejasvi Das, Anand Gopalan, Clyde Washburn and P.R. Mukund, "Dynamic Input match correction in RF Low Noise Amplifiers," 19th IEEE International Symposium on Defect and Fault Tolerance in VLSI Systems (DFT'04), 2004.

* cited by examiner

*Primary Examiner*—Michael P Nghiem
(74) *Attorney, Agent, or Firm*—Thomas, Kayden, Horstemeyer & Risley, LLP (57) ABSTRACT

Various embodiments of self-calibration systems and methods are described. One method embodiment, among others, includes imposing an alternate test to components within the device, responsive to the imposition of the alternate test, providing test responses corresponding to the components, and substantially, simultaneously mapping each of the test responses to corresponding specification values of the components.

3 Claims, 11 Drawing Sheets

SELF-CALIBRATION SYSTEMS AND METHODS

CROSS-REFERENCE TO RELATED APPLICATION

This application claims priority to copending U.S. provisional application entitled, "ON-CHIP SELF-CALIBRATION METHOD OF RF CIRCUITS USING BUILT-IN SELF TEST," having Ser. No. 60/694,388, filed Jun. 27, 2005, which is entirely incorporated herein by reference.

STATEMENT REGARDING FEDERALLY SPONSORED RESEARCH OR DEVELOPMENT

The U.S. government may have a paid-up license in this invention and the right in limited circumstances to require the patent owner to license others on reasonable terms as provided for by the terms of grant no. CCF-0325555 awarded by the National Science Foundation of the U.S.

TECHNICAL FIELD

The present invention is generally related to testing systems, and, more particularly, is related to self-calibration systems and methods.

BACKGROUND

Transceiver technology has and continues to develop at a rapid pace with concomitant challenges for designers. For instance, one area of development in particular is the use of increased carrier frequencies for various RF protocols. As carrier frequencies increase, the fidelity (e.g., the goodness or reliability) requirements for RF front-end components (e.g., pre-baseband on receive side and post-baseband on transmit side) become more critical. Another area of development that presents challenges to designers is the miniaturization of circuit components. As circuits and circuit components are scaled down in size, larger variability in performance is created due to manufacturing process variations. In the nanometer design regime, analog and RF circuits are expected to be increasingly more susceptible to process, noise and thermal variations than ever before.

Process variations such as the shift of threshold voltage, oxide thickness, and geometric size of a transistor directly affect the circuit performance. Shifting threshold voltages on n-channel metal oxide semiconductor (NMOS) and p-channel MOS (PMOS) devices of a mixer, low noise amplifier (LNA), or power amplifier, for example, can affect the performance specifications of these circuits, such as gain. Thermal variations affect carrier mobilities of NMOS and PMOS devices differently, further affecting circuit performance. For example, threshold voltage shift affects the transistor bias point and hence, its transconductance. Similarly, as temperature changes, NMOS and PMOS transistors have a threshold voltage shift $V_T$ in magnitude of roughly 2 mV/K. The coefficient for most NMOS transistors has a negative sign and the PMOS transistor coefficient has a positive sign. These threshold voltage shifts can be very detrimental to the overall circuit operation. Also, the drift of the bias voltage reference and current sources can force the transistors into the wrong region of operation and drastically reduce the overall performance. In addition, carrier electron mobility inside the transistor is a function of temperature (e.g., mobility is proportional to temperature raised to the −1.5 power). Thus, circuits that are operating at high temperatures can experience severe carrier mobility degradation and drastically reduced NMOS drain-to-source currents. This results in reduced transconductance, and significantly shifts input and output impedance of the transistors. Carefully constructed RF matching circuits generally work poorly when the transistor input and output impedances shift due to high temperature.

To ensure the fidelity of the various components of a device, manufacturers test the device and/or components using external test equipment for various specifications before shipment. Most specifications pertain to performance parameters such as gain, noise, and/or the measure of non-linearity of the components. External testing equipment is typically designed to measure the performance at a predetermined range of device operating conditions, often without the ability to scale to higher-than expected test frequencies. In the absence of scalability, the manufacturer often needs to invest in new automatic test equipment (ATE) worth millions of dollars, while the existing ATE systems become obsolete.

One solution to the above-mentioned problems is to provide only some of the functionality in the ATE. In addition, load boards comprising an electronic board with selective external test equipment functionality corresponding to specification tests deemed most critical to the fidelity of the component to be tested may be used during production testing.

Other solutions include on-chip systems. The on-chip systems employed to date present many design challenges. For instance, for on-chip solutions, if the test circuitry is too complex, there is a risk that reliability of the entire part may be compromised. Further, yield of the die may be compromised if the additional circuitry consumes too much area on the chip. Another cause of concern is the effect of process variations on the performance of RF circuits resulting in loss of manufacturing yield. In addition, such circuits have to function reliably under adverse field conditions (thermal, noise and battery power conditions).

SUMMARY

Embodiments of self-calibration systems and methods are disclosed herein.

Briefly described, one embodiment of a method, among others, comprises imposing an alternate test to components within the device, responsive to the imposition of the alternate test, providing test responses corresponding to the components, and simultaneously (or substantially simultaneously) mapping each of the test responses to corresponding specification values of the components.

One embodiment of a system, among others, comprises a processor configured to impose a test stimulus to a plurality of components within the device, and at least one sensor configured to provide a test response corresponding to a reaction by the plurality of components to the test stimulus, wherein the processor is further configured to predict at least one specification value corresponding to the plurality of components.

Other systems, methods, features, and advantages of the current disclosure will be or become apparent to one with skill in the art upon examination of the following drawings and detailed description. It is intended that all such additional systems, methods, features, and advantages be included within this description and be within the scope of the current disclosure.

BRIEF DESCRIPTION OF THE DRAWINGS

Many aspects of self-calibration systems and methods can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

FIGS. 5A-6C are plot diagrams that illustrate the various results of simulated testing described in association with FIG. 4.

DETAILED DESCRIPTION

Embodiments of self-calibration systems and methods are disclosed. In general, such self-calibration systems are based, at least in part, on a specification-driven, built-in alternate test (also referred to as S-BIST) methodology. Such a self calibration method comprises implementing a built-in alternate test on a radio frequency (RF) circuit(s) and/or component(s) to determine one or more performance specification values of the circuits and/or components accurately. Note that a component as used herein may comprise an individual discrete component, or a module or circuitry comprising a plurality of individual discrete components.

The built-in alternate test provides information about which circuit specifications have been affected by, for instance, a changed environment or manufacturing or process variations, and by how much. In general, manufacturing variations cause performance parameters(s) of a device to deviate from its nominal or desired value(s). Additionally, when a fixed stimulus is applied to a set of components or devices, variations in their performance parameters cause the device responses to vary in a correlated manner. The amount of correlation may change significantly depending on the choice of the input stimulus. An alternate test uses this fact to create a test stimulus, the response to which has a very high correlation to the variations in the performance parameters (also referred to herein as specifications). An alternate test acquires the correlation through one or more pre-computed regression functions. These regression functions use the test response as input and generate the specification values of the system (i.e., a mapping of the test response to the specifications takes place). In other words, an alternate test provides a technique to generate an optimized test stimulus and one or more pre-computed regression functions that can be used, for example, in high-volume production testing to estimate (predict) the specification(s) of the device with a very high degree of accuracy via application of a single test stimulus and a data acquisition event.

In one implementation, a stimulus (or stimuli) is applied to one or more circuit components, and a sensor is located at the output of each of the one or more circuit components to provide a test response for use in extraction of the specification values corresponding to one or more component specifications in the presence of temperature and/or process deviations. Such a sensor can be used to detect performance variations in specification values ranging from minute parametric shifts to catastrophic failures. Likewise, the self-calibration system can compensate with high resolution within this range of variation. For instance, some embodiments of the self-calibration system can exhibit a granularity of diagnosis down to approximately 0.1 dB (or dBm).

The specification values extracted by the self-calibration system are used by the self calibration system to perform corrective action (e.g., adjusting circuit bias parameters to adapt the bias voltages/currents of the RF circuit to the changed environment, adjusting for process variations using a self-calibration procedure, etc.) on compensation circuitry associated with each circuit component under test. Such corrective action is performed in a holistic manner since all specifications are evaluated simultaneously, or substantially simultaneously to ensure that adjustment of each component is done with the consideration of performance impact of other system components.

Embodiments of the disclosed self calibration systems use a digital signal processor (DSP) or other processor typically resident on systems-on-chips (SoCs), to process the sensor data and serve as the interface between the components and the external world. In one embodiment, a self-calibration system comprises a DSP that is configured to implement a digital closed-loop compensation control algorithm that allows optimal self-calibration of all RF components involved. Such self calibration systems overcome many of the challenges inherent to on-chip design, such as overcoming the difficulties in calibration due to the inability to measure deviations of RF circuit specification values from the expected values for all design specifications of interest (as opposed to one or a few). Further, such self-calibration systems can perform circuit diagnosis from the elicited test responses and implement a responsive action to compensate for the cause (e.g., thermal, process variations, degradation due to electromigration/hot-carrier effects/aging, etc.).

The self-calibration system embodiments disclosed herein are described in the context of on-chip self-calibration techniques for RF circuits to make them immune to, among other variables, thermal (in the field, e.g., large temperature swings may affect RF device bias current changes, thereby amplifying mismatch effects and degrading performance) and process (during manufacturing) variations. For instance, in the deep submicron regime, process variations are expected to be significant and can cause performance loss due to threshold voltage mismatch. Other effects may also be addressed by the embodiments disclosed herein, and process and temperature variations are one of many different effects considered within the scope of the disclosure.

The description that follows will describe a self-calibration system in the context of RF components for a front-end portion of a wireless transceiver, although self-calibration systems can be implemented in any system that tests circuit components. For instance, other applications include self-calibration for wired data transceivers, serial devices, amplifiers for entertainment devices, among others.

Figure 1:
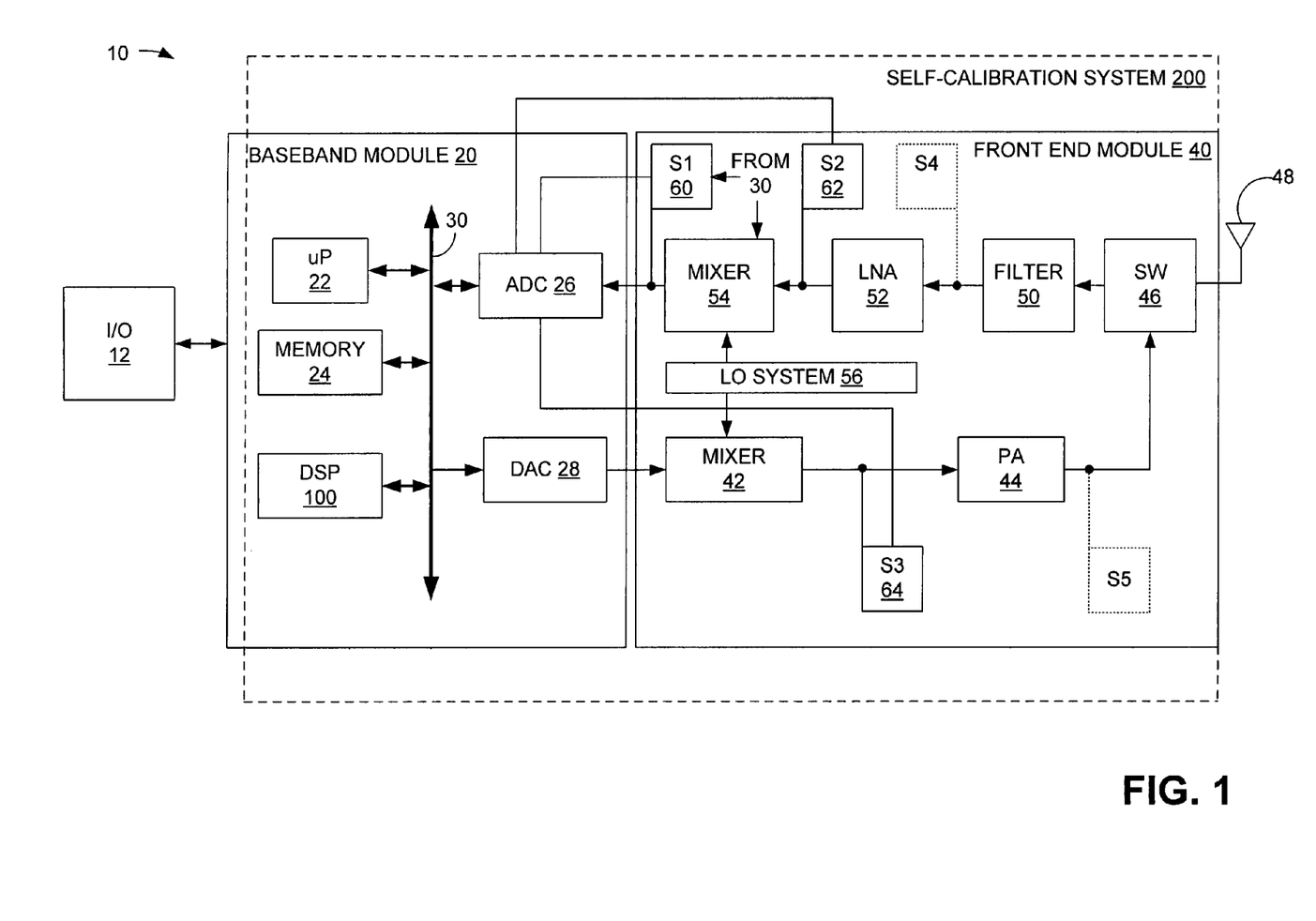
FIG. 1 is a block diagram of an exemplary transceiver in which self-calibration system and method embodiments may be implemented.

FIG. 1 is a block diagram that illustrates an exemplary transceiver 10 in which self-calibration system and method embodiments may be implemented. The transceiver 10 may be a wireless telecommunication device such as a mobile/cellular-type telephone. The transceiver 10 comprises an input/output (I/O) module 12, a baseband module 20, and a front end module 40. The transceiver 10 includes a self-calibration system 200, which in one embodiment includes components of the baseband module 20 and the front end module 40, although some embodiments may have fewer or greater components than those shown. The I/O module 12 is coupled to the baseband module 20, and may comprise one or more devices that provide input signals to the baseband module 20 or receive output signals from the baseband module 20. The I/O module 12 may comprise such devices as a speaker, display, keyboard, and/or microphone, among other devices.

The baseband module 20 is coupled between the I/O module 12 and front end module 40, and includes a microprocessor (µP) 22, memory 24, a digital signal processor (DSP) 100, an analog-digital converter (ADC) 26, and a digital-analog converter (DAC) 28 coupled together via bus 30. Other components well-known to those having ordinary skill in the art may be included in the baseband module 20, such as DC offset correction circuitry, automatic gain control, etc. The microprocessor 22 and memory 24 provide signal timing, processing, and storage functionality for the transceiver 10. The ADC 26 converts analog signals received from the front end module 40 into the digital domain for further processing in the baseband module 20. The DAC 28 converts digital communication information within the baseband module 20 into an analog signal for transmission to the front end module 40. The baseband module 20 provides control signals to various locations in the front end module 40 via bus 30. In some embodiments, control signals may be conveyed through the DAC 28. Such control signals may originate from the DSP 100 and/or from the microprocessor 22. The DSP 100 is configured to provide an alternate test to the front end module 40, as described below.

The front end module 40 comprises a mixer 42 (e.g., upconverter), power amplifier (PA) 44, switch 46, antenna 48, filter 50, low noise amplifier (LNA) 52, mixer 54 (e.g., downconverter), and local oscillator system 56. The front end module 40 also comprises the one or more sensors 60, 62, and 64 coupled at the outputs of the one or more components of interest. The sensors 60, 62, and 64 collectively occupy, in some embodiments, negligible die area compared to the area of the transceiver chip, thus representing a small area overhead and little to no performance impact on the transceiver 10. For illustrative purposes, sensors S1 60, S2 62, and S3 64 are shown coupled at the output of the mixer 54, LNA 52, and mixer 42, respectively. Each sensor 60, 62, and 64 is configured to monitor the performance of a corresponding component (i.e., on a one-to-one basis) in cooperation with the DSP 100 of the baseband module 20. Such monitoring of performance may be in response to a stimulus or stimuli provided by the DSP 100 to the various circuit components of the front end module 40 through the RF transmit and receive pathways. Note that sensors 60, 62, and 64 may also receive various control signals (e.g. via bus 30) from the DSP 100 to activate or deactivate the sensors or provide separate calibration. For brevity, control signal communication from the bus 30 to one of the sensors (S1 60) and to compensation circuitry in the mixer 54 (as described below) is illustrated symbolically by arrows in conjunction with the phrase "from 30" in FIG. 1, with the understanding that a similar communication mechanism applies to other sensors (and other compensation circuitry).

In some embodiments, performance of two or more components may be monitored by a single sensor in cooperation with the DSP 100 (e.g., two-to-one or more basis, for instance, monitoring the output of the mixer 54 to evaluate performance of the combination of the LNA 52 and mixer 54). Although each sensor 60, 62, and 64 is shown at the output of select circuit components 54, 52, 42, respectively, it would be understood by one having ordinary skill in the art in the context of this disclosure that fewer or greater quantities of components may be monitored. For instance, sensors may be positioned at the outputs of the filter 50 and/or power amplifier 44, as shown by the sensors S4 and S5, respectively, in dashed lines (the dashed lines representing the possibility of their use in some embodiments).

The sensors 60, 62, and 64 may each be configured as envelope detectors (e.g., a single-diode envelope detector) that extract DC or low frequency signal components from an RF output response. The extracted DC or low frequency components are provided to the ADC 26, sampled at the ADC 26, and then provided to the DSP 100 to map the data corresponding to the sensor output to the specification of the component of interest. Thus, the ADC 26 of the baseband module 20 may be employed without requiring a separate higher performance analog to digital converter. Each of the front end components receive the stimulus signal or signals sourced from the DSP 100 via the receive and transmit pathways that include the circuit components to be monitored, and the sensors 60, 62, and 64 each monitor and receive the response(s) (test response) of the corresponding component. The sensors 60, 62, and 64 also receive activation/deactivation or calibration control signals via bus 30 as provided by the DSP 100. For example, in a temperature compensation configuration, the sensors 60, 62, and 64 can be calibrated to compensate for thermal swings.

One or more of the circuit components (e.g., mixers 42 and 54, LNA 52) of the front end module 40 may include compensation circuitry that is configured to receive control signals from the DSP 100, as will be explained below. In some embodiments, the compensation circuitry may be implemented external to the circuit component of interest, yet coupled to the circuit component of interest.

With regard to transmit functionality, an analog signal received from the DAC 28 is modulated and up-converted by mixer 42 based on a local oscillator signal received by the local oscillator system 56. The local oscillator system 56 may comprise a synthesizer that comprises a phase-locked loop, among other components. The modulated signal is provided to power amplifier 44, which amplifies the modulated signal to an appropriate power level for transmission. The amplified signal is provided to switch 46, which may be controlled by, for example, the baseband module 20 (e.g., through a control line not shown). The switch 46 may be configured as a duplexer and switch module (e.g., for full duplex operation) in some embodiments. The transmit signal energy is then provided from the switch 46 to the antenna 48 for transmission.

With regard to receive functionality, signals are received at the antenna 48, routed by switch 46 to the filter 50. The filter 50, in one embodiment, may be configured as a bandpass filter to pass all channels of a desired frequency range of operation and reject all frequencies outside the desired frequency range. The filtered signal is provided to the LNA 52, which amplifies the filtered signal. The amplified signal is provided to the mixer 54, which based on the local oscillator signal received from local oscillator system 56, downconverts the signal to a lower frequency for processing by the ADC 26. It should be noted that, for simplicity, only the basic components of the transceiver 10 are illustrated herein. Further, although described in the context of a direct conversion system, other architectures may incorporate the self-calibration systems and methods disclosed herein, such as superheterodyne or low intermediate frequency (IF) architectures.

Figure 2:
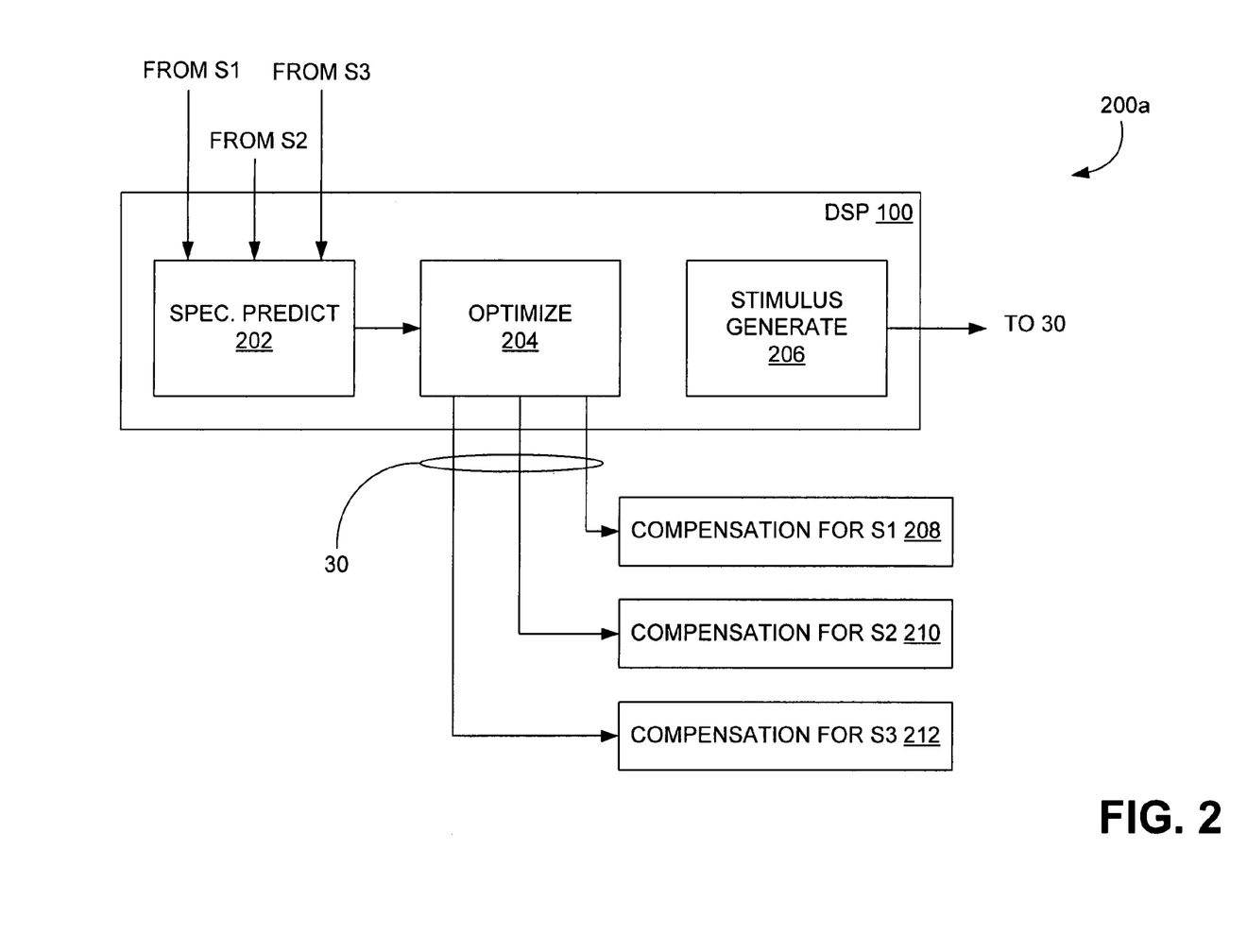
FIG. 2 is a block diagram of an embodiment of a self-calibration system used in the exemplary transceiver shown in FIG. 1.

FIG. 2 is a block diagram of an embodiment of a self-calibration system 200a used in the exemplary transceiver 10. The self-calibration system 200a comprises the DSP 100 and compensation circuitry 208, 210, and 212, although some embodiments of the self-calibration system 200 may further include the sensors 60, 62, and 64. The DSP 100 comprises several modules, including a specification predict (spec. predict) module 202, an optimization (optimize) module 204, and a stimulus generate module 206. Although the DSP 100 is shown as including modules 202, 204, and 206, in some embodiments, functionality of one or more modules may be combined, and/or distributed among one or more additional modules within the DSP 100 or distributed among the DSP 100 and/or other components. The specification predict module 202 receives, as inputs, data corresponding to the signals from sensors S1 60, S2 62, and S3 64 via ADC 26. The specification predict module 202 uses the sensor data to generate a mapping function as described above for prediction of one or more specifications. In one embodiment, the specification predict module 202 operates according to at least two modes. In one mode, a prediction is derived at the factory to compensate for process variation effects. In another mode, prediction is performed regularly or by pre-defined rule in the field to address temperature or other environmental or system variations. The optimization module 204 decides whether adjustment of a circuit component is to be performed based on one or more optimization rules, as explained below, and provides control signals over bus 30 to compensation circuitry 208, 210, and 212. Few or greater quantities of bus 30 can be used in some embodiments. Compensation module (or circuitry) 208 corresponds to mixer 54, compensation module 210 corresponds to LNA 52, and compensation module 212 corresponds to mixer 42. In one embodiment, compensation modules for one or more of mixer 42, mixer 54, or LNA 52 can be integrated in mixer 42, mixer 54, or LNA 52, or externally coupled to the same. The stimulus generate module 206 generates a stimulus or stimuli for the device under test (e.g., for the front end module 40).

An alternate test is described in U.S. Pat. No. 6,865,500, entitled, "Method for Testing Analog Circuits," and herein incorporated in its entirety by reference. In general, a device under test, such as the transceiver 10 or, in particular, the individual components that comprise the transceiver, abides by certain specifications (e.g., gain, noise figure, 1 dB compression point, and other specifications pertaining to, say, non-linearity of the device). The specifications are typically dictated by the standard or protocol the device operates under, such as code-division multiple access (CDMA) for a cell phone. By imposing an alternate test to the front end module 40, all of the performance specifications for the front end components can be predicted accurately by the specification predict module 202 from the test response observed via sensors 60, 62, and 64 located in the front end module 40.

The test stimulus or stimuli of the alternate test imposed on the front end module 40 by the stimulus generate module 206 may comprise a single sinusoid or multi-tone stimulus. In one embodiment, the test stimulus or stimuli for each targeted component is selected during a preliminary calibration procedure (e.g., performed at the factory). The test response may comprise a different waveform corresponding to each specification, and the differences in waveforms are correlated to the specification differences. For example, a test stimulus (or stimuli) is applied by the stimulus generate module 206 to the front end module 40 and selected so that the test response monitored by the sensors 60, 62, and 64 is strongly correlated to all the specifications of interest. A (pre-computed) nonlinear mapping function (e.g., regression model) obtained through a preliminary calibration procedure (e.g., provided in conjunction with the specification predict module 202 at the factory) provides the relationship between the test response and the specification of interest. For instance, the specification predict module 202 applies a regression model that maps the alternate test response to the test specification values of the front end module 40. Such a regression model can be calibrated to compensate for thermal swings. Thus, the specification values for the components of the front end module 40 can be predicted (e.g., inferred) accurately by the specification predict module 202 from the alternate test response. The predicted specification values are used by the optimization module 204 to determine whether a self-calibration run is to be performed or not. In one embodiment, the self-calibration is performed for parametric failures. Such a determination as to whether a self-calibration run is to be performed or not may be in the form of a pass/fail decision (i.e., a pass/fail decision is performed to infer parametric failures based on specification values).

Figure 3:
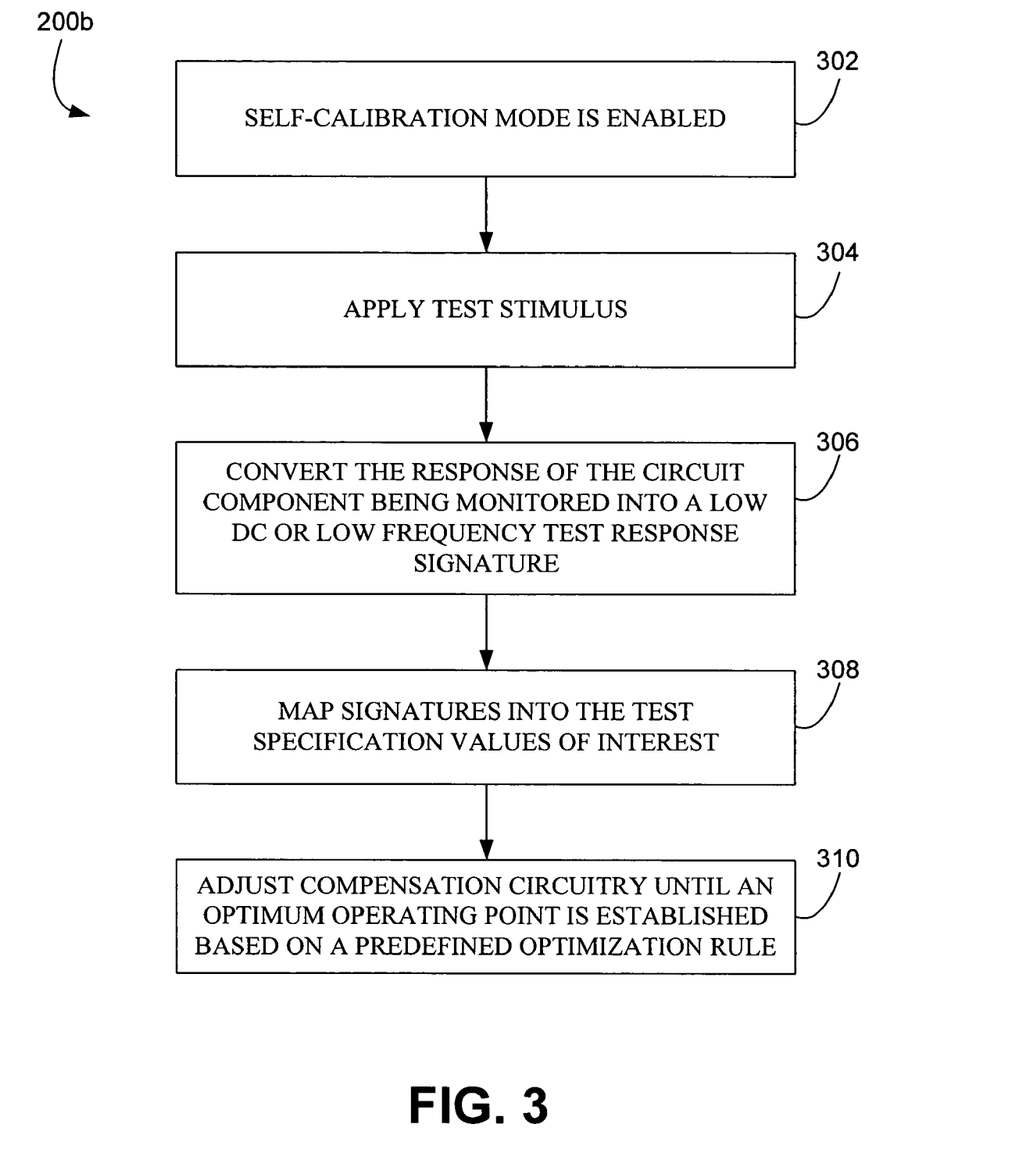
FIG. 3 is a flow diagram that illustrates a self-calibration method embodiment that can be employed by the self-calibration system shown in FIG. 2.

FIG. 3 is a flow diagram that illustrates a self-calibration method embodiment 200b employed by the calibration system 200a shown in FIG. 2. The self-calibration method 200b may be implemented in the field and/or during or after the manufacturing process for a given device. A self-calibration mode is enabled depending on the application (302). For instance, self-calibration may be implemented for thermal variations as one application, or for process variations as another application. In other words, one mode corresponds to an off-line procedure implemented at the factory whereby calibration is performed for process variations. Another mode corresponds to field applications whereby thermal variations can be regularly addressed. Although described in the context of variations in process or temperature, one having ordinary skill in the art would understand in the context of this disclosure that other variations, such as system-level variations (e.g., received signal power) similarly apply. Thus, the frequency of implementing the self-calibration method 200b can vary. For instance, when applied to a manufacturing test at the end of an assembly line, the frequency can be based on the speed at which parts come off the line. In the field, for example, the self-test can be employed at each power-up instance of a device (e.g., switching on a cell phone). The DSP 100 activates the test stimulus generate module 206 to apply an optimized stimulus (or stimuli) to the device for performing self-calibration (304).

The sensors 60, 62, and 64 convert the response (e.g., reaction) of the circuit component being monitored into a DC or low frequency test response signature (306). Based on one or more pre-defined regression models, as described above, the signatures are mapped into the test specification values of interest in the presence of temperature and/or process deviations (308). The optimization module 204 adjusts the compensation circuitry (e.g., 208, 210, 212) via a trimming process that is iterated until the optimum operating point is established based on a predefined optimization rule (310). In one embodiment, the predefined optimization rule is programmed at the factory, and can be used for compensating for process variations and evaluated in the field for thermal deviations. In one embodiment, all the specifications are considered while performing compensation, although in some embodiments, fewer specifications may be considered.

To achieve good compensation, the optimization process is preferably driven by a cost function based on the optimum circuit performance. In other words, an optimization rule is driven towards minimizing (or maximizing) the value of a predefined cost function. The minimum (or maximum) value corresponds to an optimum calibration. Depending on the circuit application and the distance between the nominal specification value and its bound, various formulations of the cost function are possible. For example, assume a stringent noise figure requirement for a circuit of interest, whereas the other specifications have enough performance margins. In such a case, the self-calibration method 200b focuses mainly on noise figure performance. For diverse applications, the cost function φ(x) for variable x (e.g., each variable is a bias voltage or current that can be adjusted to compensate the RF circuit performance loss) is defined as follows:

φ(x)=Σ$w_i$·$f_i$(x), where $f_i$(x)={|$S_i$(x)−$S_{iT}$|, if $S_i$(x) is worse than $S_{iT}$, or 0 otherwise}, $w_i$ is a weighting factor, and $S_i$ and $S_{iT}$ represent the i-th specification value and its target (nominal) specification bound, respectively. In this scheme, the minimum value of the cost function corresponds to optimum self-calibration. In general, some specifications may need to be compromised since their rates of change conflict with other specifications. For this purpose, the function $f_i$(x) defines a margin around the target specification bound, where it is simply set to zero for specification values better than this boundary, otherwise to a positive value proportional to the distance from the boundary. Although the above describes one possible optimization rule, one having ordinary skill in the art would understand in the context of this disclosure that other optimization rules may similarly apply.

Figure 4:
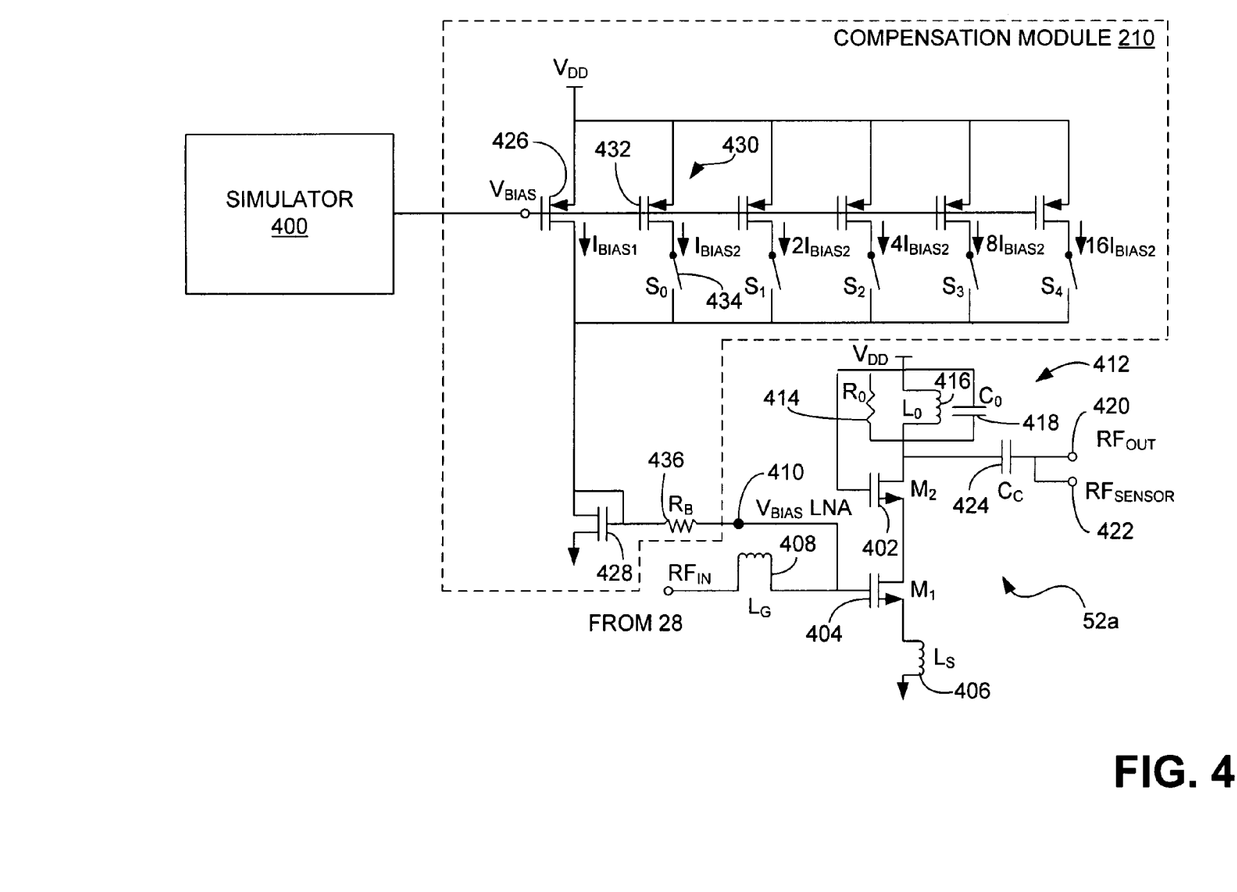
FIG. 4 is a block diagram of an embodiment of a compensation circuit and an associated circuit component subjected to simulated testing.

FIG. 4 is a block diagram showing select portions of the calibration system 200a that were used in simulated testing, including compensation module 210, which is used to adjust the bias current for a 2.4 GHz LNA 52a to maximally compensate for performance deviations. As will be described below in association with FIGS. 5A-6C, the self calibration system 200 can significantly reduce process variation effects, resulting in enhanced circuit yield and better reliability in the presence of temperature deviations. The compensation module 210 is coupled to the LNA 52a. Functionality of the modules 202, 204, and 206 of DSP 100 is substituted with a simulator 400 that, among other functions, is used to impose the alternate specification test, predict the performance specifications of the LNA 52a from the test response, and change the operating point of the LNA 52a to maximally or optimally compensate for loss of performance. The specifications of interest comprise the well-known $S_{11}$, $S_{21}$ $S_{22}$, noise figure (NF), and 1 dB compression point ($P_{1\ dB}$). The sensor 62 extracts the specification values of interest using an alternate built-in test as implemented by the simulator 400 acting on behalf of the optimization module 204, which keeps the error of specification prediction below approximately 0.2%. An assumption made in simulated testing is that the specification value is extracted under ideal conditions.

The cost function for optimization is defined for the target specification vector $S_T$: [$S_{11}$ $S_{21}$ $S_{22}$ NF $P_{1\ dB}$] with the value of [−20 12.28 −20 2.125 −13.8]. Many instances of the circuit are simulated via Monte-Carlo simulation using predefined process variable statistics and the results of these Cadence-Spectre simulations are used for obtaining a min-max value pair for each specification. The weighting factors $w_i$ are defined as the reciprocal of the differences between these min-max values, hence each product in φ(x) is normalized to the specification limits for each specification.

The exemplary LNA 52a shown in FIG. 4 is configured as a 2.4 GHz complementary metal oxide semiconductor (CMOS) LNA using National Semiconductor's 0.18 μm CMOS9 process technology. The LNA 52a is a well-known circuit, comprising an NMOS transistor 402 (M2) having a source connection coupled to the drain connection of an NMOS transistor 404 (MO. The source connection of the transistor 404 is coupled to ground via an inductor (Ls) 406. The gate of transistor 404 is coupled to the RF input via an inductor (Lg) 408 and to the compensation module 210 via a coupling node 410. The drain connection of the transistor 402 is coupled to a voltage source $V_{DD}$ via a passive network 412.

The passive network 412 comprises a resistor (Ro) 414, inductor (Lo) 416, and capacitor (Co) 418 arranged in a parallel configuration. The gate of transistor 402 is also coupled to the voltage source $V_{DD}$. The drain of transistor 402 is coupled to the RF output node 420 and RF sensor output node 422 via a coupling capacitor (Cc) 424.

The compensation module 210, through cooperation with the simulator 400 acting on behalf of the optimization module 204, adjusts the bias current of the LNA 52a. The compensation module 210 is configured as a programmable bias circuit, and comprises a PMOS transistor 426 coupled at the source connection to voltage source $V_{DD}$. The PMOS transistor 426 is coupled at the drain connection to the drain connection of NMOS transistor 428. The PMOS transistor 426 is arranged in a parallel configuration with five (5) series circuits 430 coupled between the source and drain connections of the PMOS transistor 426. Each series circuit 430 comprises a PMOS transistor 432 coupled at the source connection to the source connection of PMOS transistor 426, and coupled at the drain connection to the drain connection of PMOS transistor 426 via switch 434. The gate of each PMOS transistor 432 of each series circuit 430 is coupled to the gate of the PMOS transistor 426, which is coupled to the simulator 400. The source connection of transistor 428 is coupled to ground. The gate of transistor 428 is coupled to the drain connection of transistor 426 and selectively coupled to transistors 432 of each series circuit 430. The gate of transistor 428 is also coupled to resistor ($R_B$) 436. Resistor 436 is coupled to coupling node 410 of compensation module 210.

In operation, transistors 428 and 404 constitute a current-mirror configuration. By controlling switches 434, the bias current through transistor 428 can be varied. Because of the current mirror configuration, such changes in the bias current are reflected in the transistor 404 of the LNA 52a. In one exemplary operation, the total current in the bias circuit (compensation module 210) is set to a range of 240 μA to 880 μA with a $I_{bias1}$ value of 240 μA and $I_{bias2}$ value of 20 μA. By scaling the ratio of transistors MI 404 into the transistor 428 in the bias circuitry (compensation module 210), the bias current of the LNA 52a is approximately 10 times that of the total current from the bias network with a resolution of 200 μA. Note that compensation is illustrated for a single circuit component (the LNA 52a), although compensation can be employed for other circuit components (e.g., compensating for passive component impedance values in one or more components of the transceiver 10, for instance by adding a capacitor in series or parallel to an existing capacitor, adding a variable capacitance, modifying tap locations in an inductor, etc.). Further, compensation circuitry for one component may be shared, at least in part, for other circuit components.

With regard to temperature calibration, to emulate large swings of temperature, the LNA 52a with the nominal process variable values was simulated over the temperature range of −30° C. to 70° C. in steps of 20° C. using the Cadence Spectre simulator 400. The capabilities of the proposed self-calibration scheme are demonstrated for 6 temperature points, as shown in Table 1 below.

| Spec. | $S_T$ | Original spec range: A | Spec range after calibration: B |
|---|---|---|---|
| $S_{11}$ (dB) | <−20 | (−26.6, −20.4) | (−31.2, −20.4) |
| $S_{21}$ (dB) | >12.1 | (11.2, 13.3) | (12.2, 13.2) |
| $S_{22}$ (dB) | <−20 | (−28.8, −23.9) | (−29.1, −21.4) |

-continued

| Spec. | $S_T$ | Original spec range: A | Spec range after calibration: B |
|---|---|---|---|
| NF (dB) | <2.125 | (1.45, 2.77) | (1.45, 2.45) |
| $P_{1dB}$ (dBm) | >−13.8 | (−14.6, −13.3) | (−14.6, −13.7) |

Table 1 summarizes the results of temperature effect calibration. The third and fourth columns in Table 1 show best and worst specification values among the six cases before and after calibration. For example, the best case specification $S_{11}$ is −26.6 dB and the worst case value of the same is −20.4 dB. After calibration, the best value improved to −31.2 dB even though the worst value remains the same as before. Both best and worst cases meet the target specification bound $S_T$ of −20 dB. As can be seen from Table 1, the specifications $S_{21}$ and NF are compensated to meet the specification bound $S_T$ or approach the target specification bound $S_T$, with little degradation of the specification $P_{1dB}$. Both of the specifications $S_{11}$ and $S_{22}$ remain within the required bounds after calibration. In this example, even though all the specifications can not be compensated effectively, some critical ones, such as gain, are compensated to remain in the region defined by $S_T$ with little or no degradation of the other specification values.

Figure 5A:
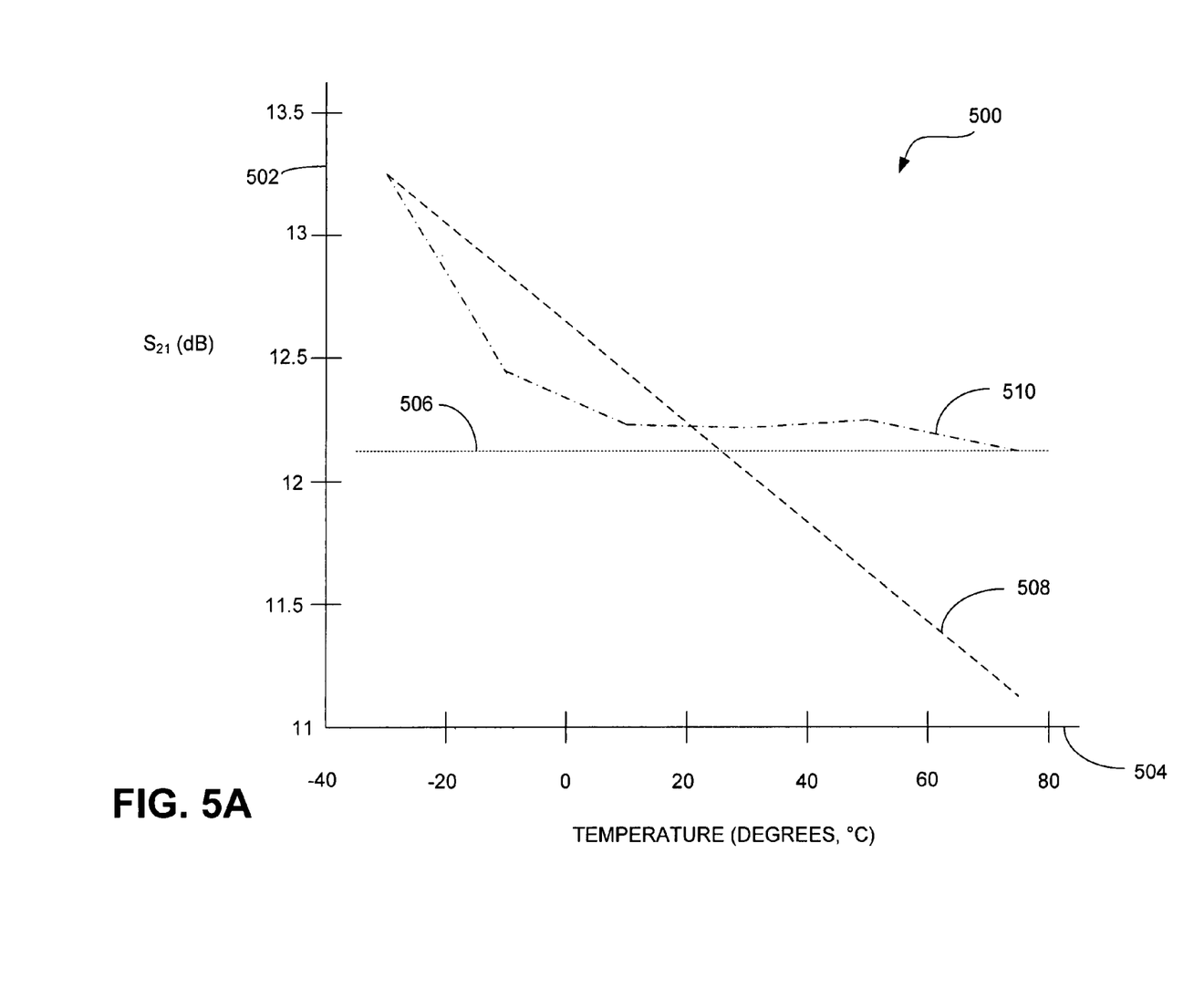
Figure 5B:
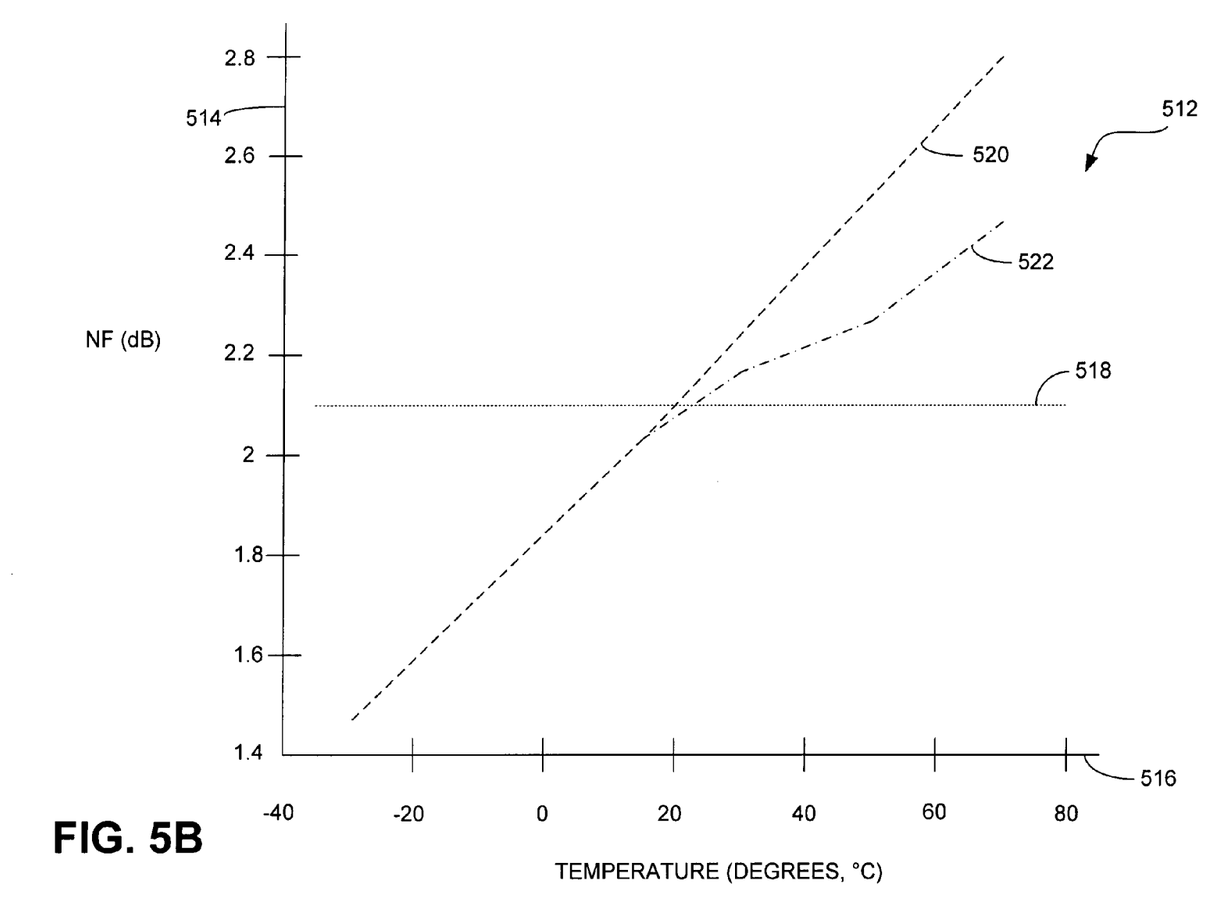
Figure 5C:
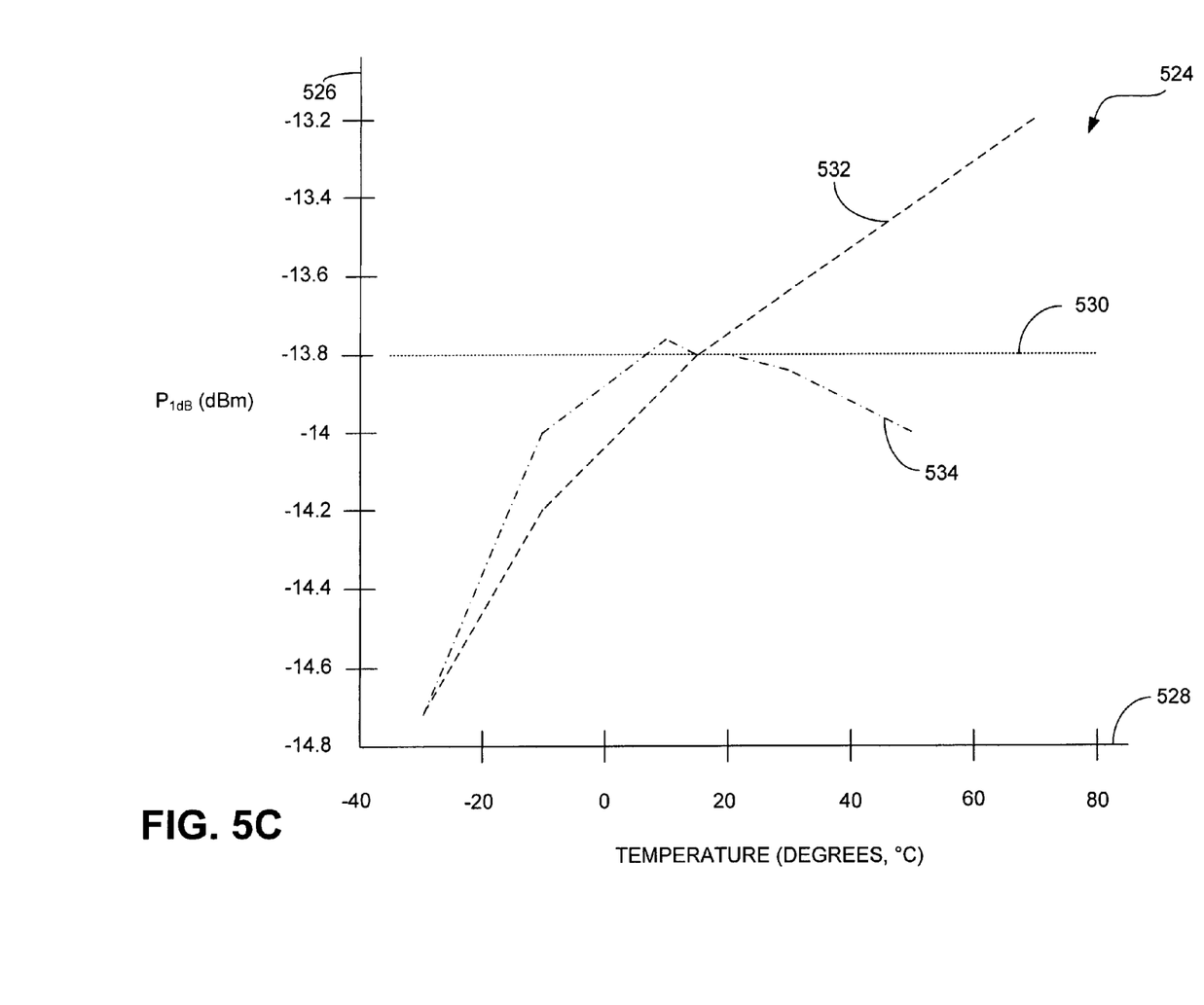

FIGS. 5A-5C include plots that show the specification value changes after calibration for each temperature, which illustrate the impact of three different specifications when performing compensation for the LNA 52a shown in FIG. 4. The optimum result is ideally assumed to be the flat specification value for various temperatures after calibration. Referring to FIG. 5A, shown is a plot 500 with a vertical axis 502 corresponding to the $S_{21}$ specification (in dB) and a horizontal axis 504 corresponding to temperature (in degrees Celsius). Line 506 corresponds to the nominal or target specification value at room temperature. Line 508 corresponds to the variability in the $S_{21}$ specification value as a function of temperature without calibration. Line 510 corresponds to the variability in the $S_{21}$ specification value as a function of temperature with calibration. The plot 500 in FIG. 5A shows that the specification $S_{21}$ is well confined in the region defined by $S_T$. That is, line 508 shows that the $S_{21}$ specification value changes from approximately 11 dB to 13.25 dB over the range of temperatures when uncompensated. With compensation, the specification value ranges between approximately 12 dB to 13.25 dB. Thus, compensation is needed to maintain the specification value close to nominal over the range of temperatures shown.

Referring to FIG. 5B, shown is a plot 512 with a vertical axis 514 corresponding to the noise figure (NF) specification (in dB) and a horizontal axis 516 corresponding to temperature (in degrees Celsius). Line 518 corresponds to the nominal or target specification value at room temperature. Line 520 corresponds to the variability in the NF specification value as a function of temperature without calibration. Line 522 corresponds to the variability in the NF specification value as a function of temperature with calibration. As shown in FIG. 5B, the NF improves significantly (closer to nominal) due to compensation at higher temperatures. That is, the LNA 52a can operate at higher temperatures with less impact on the NF specification value when compensation is applied.

Referring to FIG. 5C, shown is a plot 524 with a vertical axis 526 corresponding to the $P_{1dB}$ specification (in dBm) and a horizontal axis 528 corresponding to temperature (in degrees Celsius). The $P_{1dB}$ specification provides a measure of the non-linearity of a device, such as the LNA 52a. Line 530 corresponds to the nominal or target specification value at room temperature. Line 532 corresponds to the variability in the $P_{1dB}$ specification value as a function of temperature without calibration. Line 534 corresponds to the variability in the $P_{1dB}$ specification value as a function of temperature with calibration. As shown in FIG. 5C, the $P_{1dB}$ improves significantly (closer to nominal) due to compensation.

The three specifications in FIGS. 5A-5C were accounted for simultaneously throughout compensation to ensure that each specification value is optimized. In some embodiments, weighting may be employed to one or more of the specification values based on design considerations. It is noted from FIGS. 5A-5C that the diagnostic resolution and compensation granularity for the specification values can be extremely small (e.g., in units of tenths of a dB), allowing for optimum compensation with the least impact on other design constraints, such as power.

In the presence of process variations, the self-calibration ability of the self calibration system 200 is demonstrated on a number of LNA instances, each representing statistical corners for different specifications. These statistical corners present the worst and best instances for each specification performance, which are obtained through Monte Carlo simulations. The optimization metric is driven by an objective function that is based on minimizing the deviation in each specification in the presence of process variations, similar to a metric used in optimization module 204. Note that this objective function is just an example, and may not be the best for every specification. For example, minimal variation around the nominal value is most desired for $S_{11}$, $S_{22}$ and generally for $S_{21}$, whereas the ratio NF/$P_{1dB}$ is better when minimized/maximized.

In this sense, an assumption is made that the figure of merit for evaluation is the change in specification variability after calibration, which can be measured by the ratio of the specification variation range after calibration over the one before calibration. For successful calibration, such a ratio is preferably smaller than one (1), and smaller values represent better compensation. In this sense, the statistical corners are perfect candidates for the evaluation set, since they have the largest deviation from the nominal and hence provide the biggest challenge for the proposed self-calibration scheme.

The specification ranges before and after calibration are shown in Table 2 below.

| Spec. | Original spec range: A | Spec range after calibration: B | Ratio: R (B/A) |
|---|---|---|---|
| $S_{11}$ (dB) | (−42.5, −16.5) | (−31.3, −17.5) | 0.5288 |
| $S_{21}$ (dB) | (10.5, 13.2) | (12.2, 12.7) | 0.1722 |
| $S_{22}$ (dB) | (−27.5, −15.5) | (25.9, −15.6) | 0.8574 |
| NF (dB) | (1.78, 2.75) | (1.87, 2.39) | 0.5349 |
| $P_{1dB}$ (dBm) | (−15.19, −11.96) | (−14.8, −13.8) | 0.3168 |

In Table 2, the second column shows the minimum and maximum specification values for each specification before calibration and the third column shows the specification ranges after calibration. The last column displays the figure of merit, R, which is the ratio of the specification range after calibration over the one before calibration. For example, the specification $S_{21}$ shows 13.2 dB and 10.5 dB as the minimum and maximum values for the circuits before calibration. After calibration theses extreme values shrink to 12.2 dB and 12.7 dB, thus achieve the ratio of 0.1722. Further, Table 2 shows that R is smaller than one (1) for each specification of interest, hence the self-calibration methodology is successful.

Figure 6A:
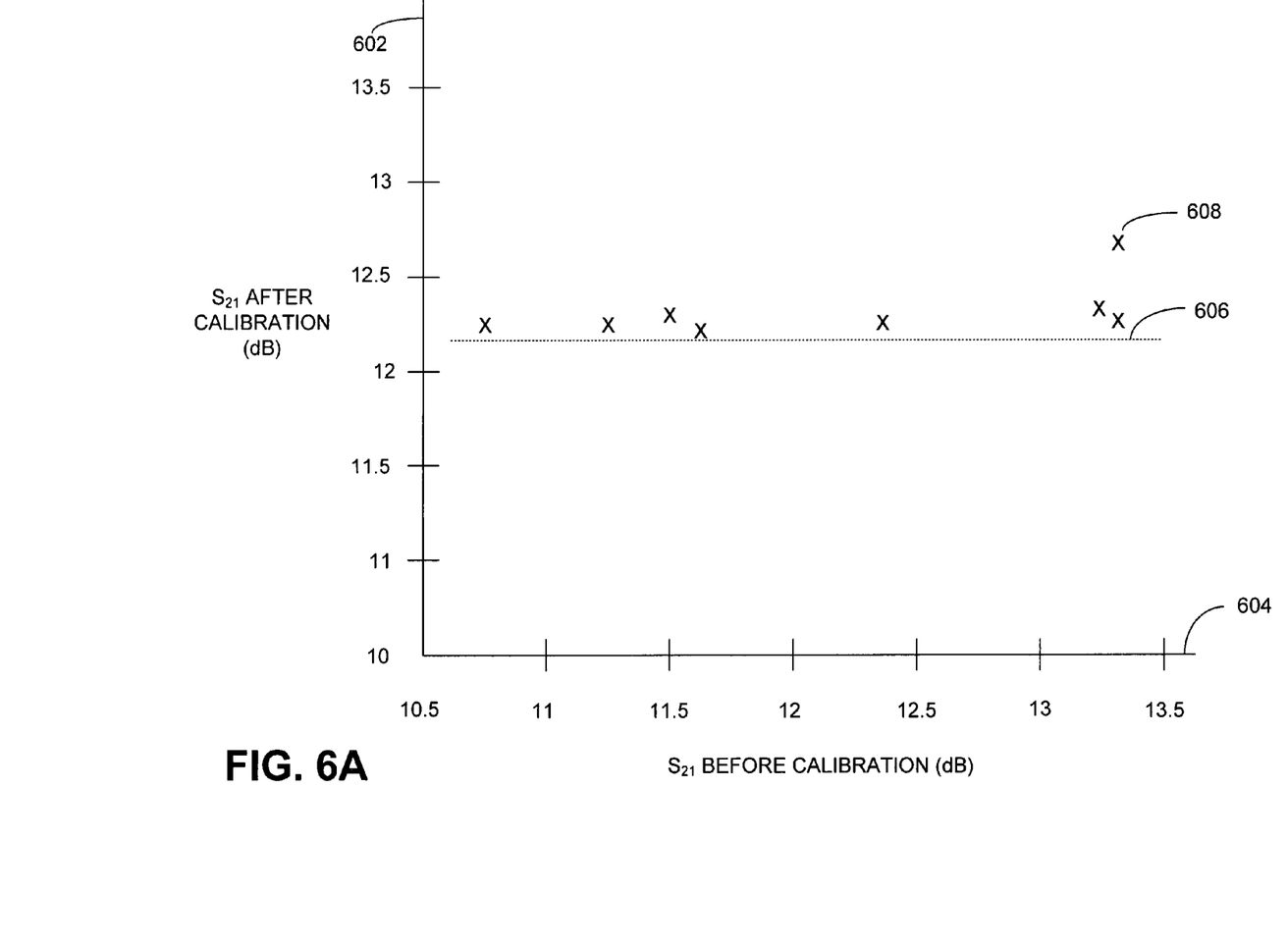
Figure 6B:
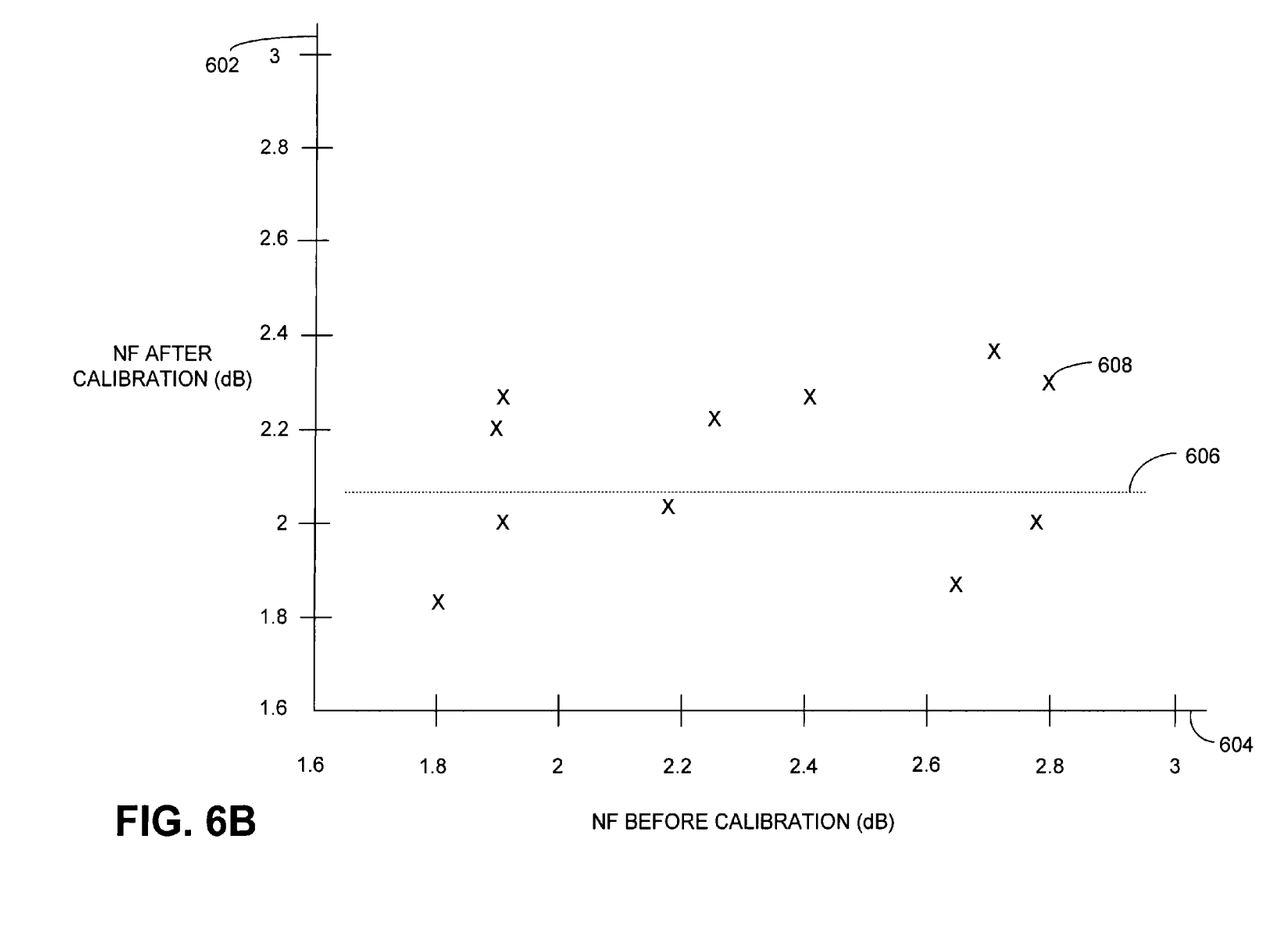
Figure 6C:
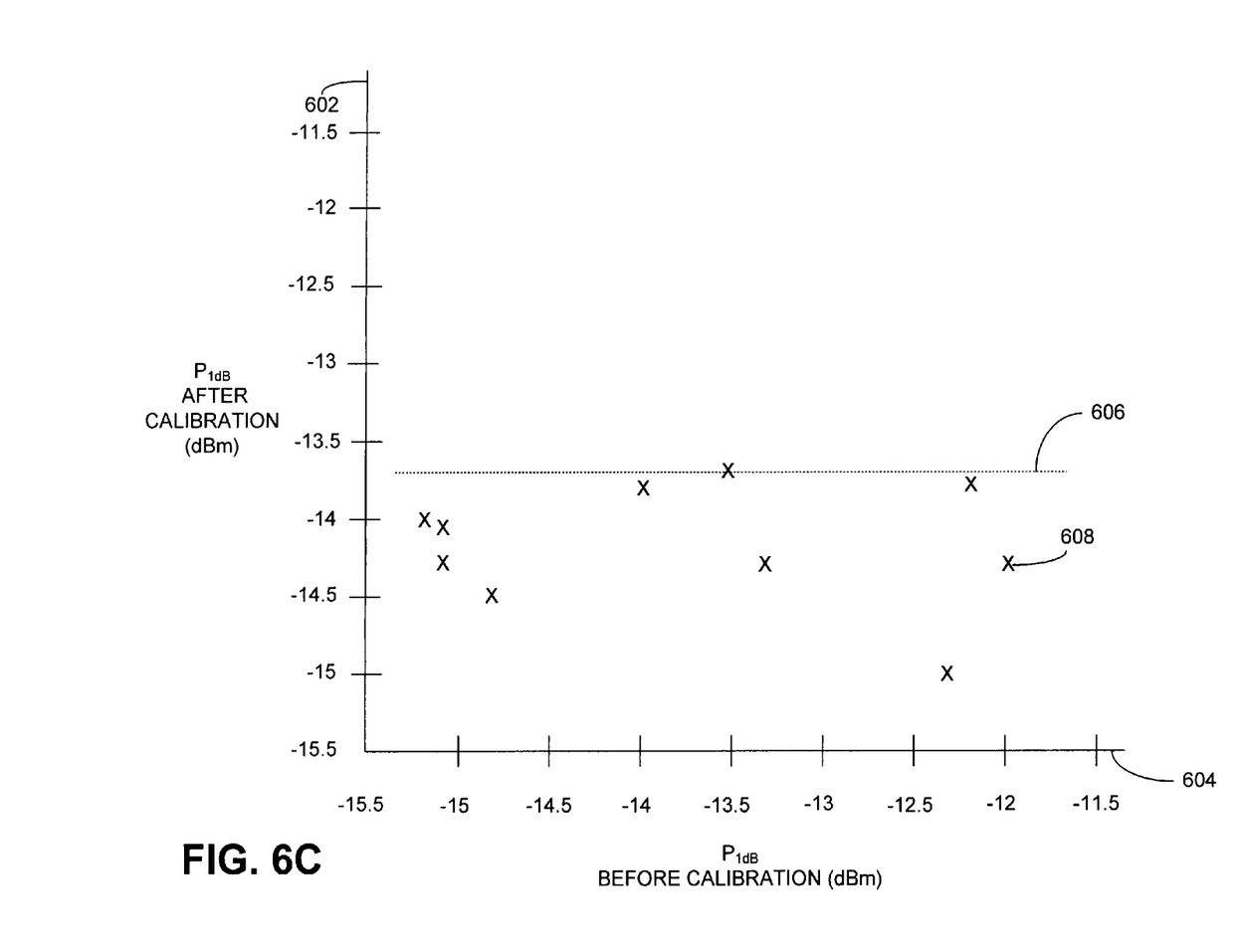

FIGS. 6A-6C include scatter plots that show the calibration of the specifications $S_{21}$, NF, $P_{1dB}$ where, for all plots shown, the x-axis 604 corresponds to the specification value before calibration and the y-axis 602 the same value after calibration. As these example plots suggest, the wide range of variation is dramatically reduced (data points, represented by 608, are close to nominal, represented by line 606) for all specifications after calibration.

In the simulated experiment described above in association with FIGS. 4-6C, the evaluation set utilizes the worst instances, which are, in general, out of the test pass/fail thresholds, resulting in a fail during production test. However, using the calibration process these instances can be brought within the pass-region. As a result, the self-calibration systems and method disclosed herein can increase production yield due to this added value, despite the additional compensation circuitry and area-overhead. Further, the simulation results described above reveal that the self-calibration method 200b described herein performs well in the presence of temperature and process variations.

Figure 7:
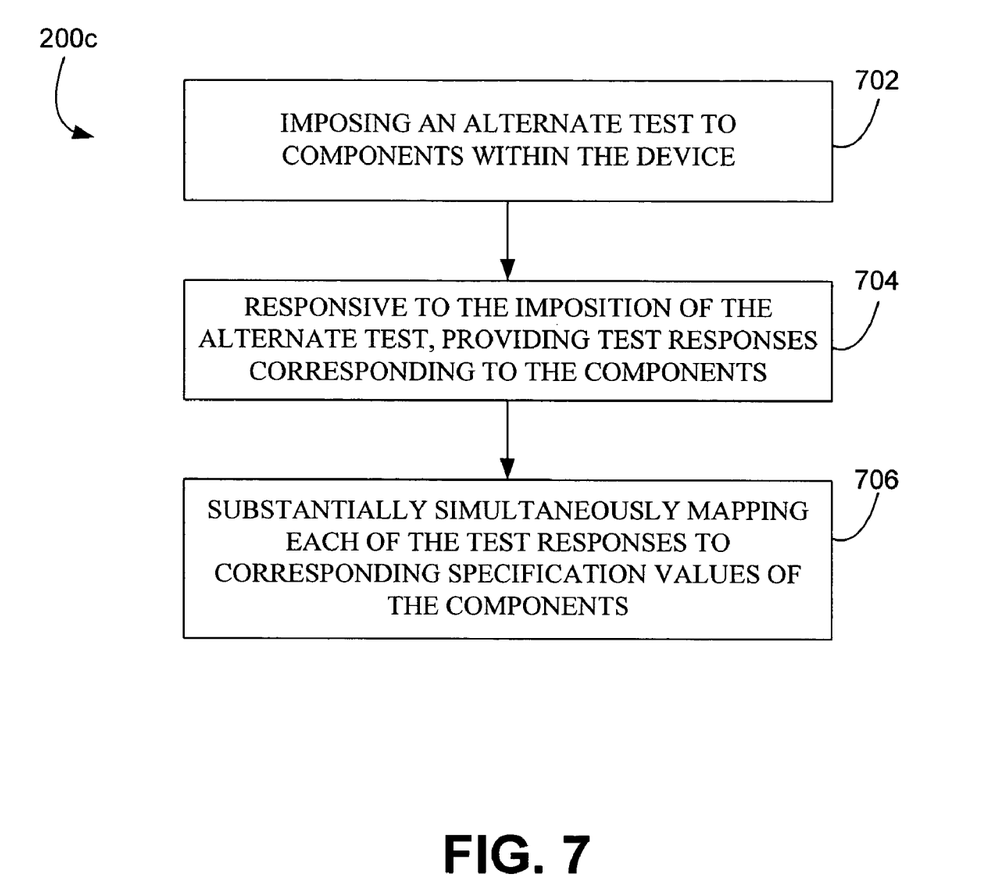
FIG. 7 is a flow diagram of a method that illustrates a self-calibration method embodiment that can be employed by the self-calibration system shown in FIG. 2.

In view of the above-description, it would be appreciated in the context of this disclosure that one self-calibration method embodiment 200c, illustrated in FIG. 7, comprises imposing an alternate test to components within the device (702), responsive to the imposition of the alternate test, providing test responses corresponding to the components (704), and substantially simultaneously mapping each of the test responses to corresponding specification values of the components (706).

Any process descriptions or blocks in flow charts should be understood as representing modules, segments, or portions of code which include one or more executable instructions for implementing specific logical functions in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present invention.

It should be emphasized that the above-described embodiments of the present disclosure, particularly, any "preferred" embodiments, are merely possible examples of implementations, merely set forth for a clear understanding of the principles of the invention. Many variations and modifications may be made to the above-described embodiment(s) of the disclosure without departing substantially from the spirit and principles of the invention. All such modifications and variations are intended to be included herein within the scope of this disclosure and the present invention and protected by the following claims.

What is claimed is:

1. A self-calibration system implemented internally to a device, comprising:
   a processor internal to the device, the processor configured to impose a test stimulus to a plurality of components within the device; and
   at least one sensor internal to the device, the at least one sensor configured to provide a test response corresponding to a reaction by the plurality of components to the test stimulus;
   compensation circuitry coupled to at least one of the plurality of components:
   wherein the processor is further configured to predict at least one specification value based on the test response corresponding to the reaction of the plurality of components, and determine, based on the at least one specification value, whether to signal to the compensation circuitry to adjust the at least one specification value of the plurality of components.

2. The system of claim 1, wherein the processor is further configured to substantially concurrently predict a plurality of specification values corresponding to the plurality of components.

3. The system of claim 1, wherein responsive to the determination, the compensation circuitry performs compensation to adjust the at least one specification value of the plurality of components that counters variations to the specification values based on process or environmental conditions.

* * * * *